Sept. 23, 1941. W. M. ANDERSON 2,256,637
WIRE COUPLING AND METHOD OF PRODUCING SAME
Filed Nov. 14, 1938 2 Sheets-Sheet 1
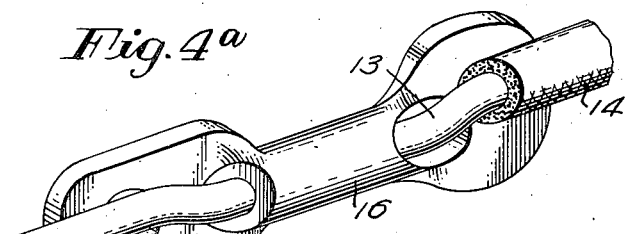
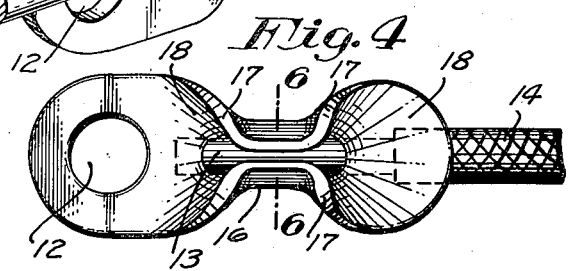
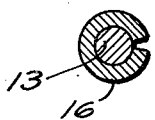
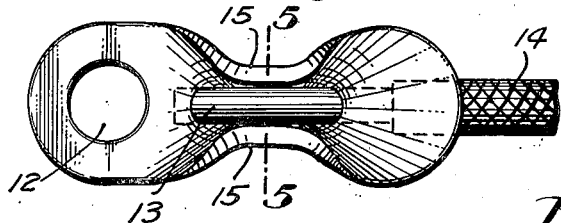
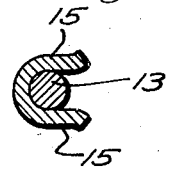
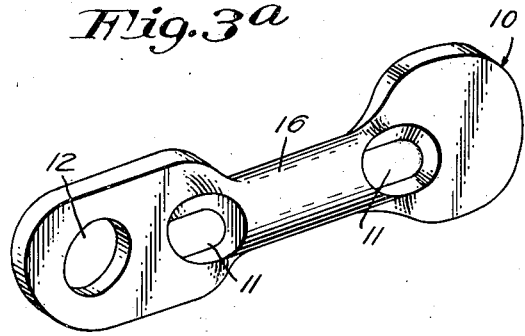
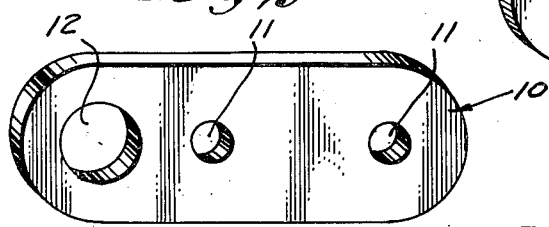
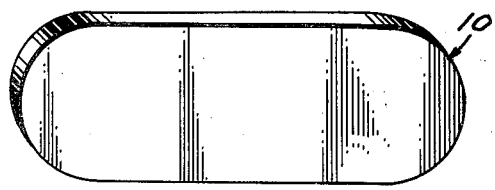
Inventor
William M. Anderson
By his Attorneys Sept. 23, 1941.   W. M. ANDERSON   2,256,637
WIRE COUPLING AND METHOD OF PRODUCING SAME
Filed Nov. 14, 1938   2 Sheets-Sheet 2

Inventor
William M. Anderson
By his Attorneys

Patented Sept. 23, 1941

2,256,637

UNITED STATES PATENT OFFICE 2,256,637

WIRE COUPLING AND METHOD OF PRODUCING SAME

William M. Anderson, Minneapolis, Minn., assignor to himself and F. J. Kerner, Minneapolis, Minn., a copartnership Application November 14, 1938, Serial No. 240,319

11 Claims. (Cl. 29—155.55)

My invention provides an extremely simple and highly efficient coupling lug especially adapted for mechanically connecting the electric wires of toasters, telephone systems, radios, and the like, to bus bars or other contacting elements. The invention also involves an improved process of producing the said coupling, all as will hereinafter more fully appear.

The improved coupling is illustrated in the accompanying drawings wherein like characters indicate like parts throughout the several views.

Referring to the drawings:

Fig. 1 is a perspective showing the blank or metal plate from which the coupling lug is made;

Fig. 2 shows the blank with holes punched therein;

Fig. 3 shows the blank or coupling lug forming plate about one-half completed but applied to the end of an electric wire, looking at the same from the bottom;

Fig. 3a is a view of the coupling lug shown in Fig. 3 with the wire removed and looking at the coupling from the top;

Fig. 4 is a view corresponding to Fig. 3 but showing the coupling lug completely applied to the wire, looking at the same from the bottom;

Fig. 4a is a view of the portions shown in Fig. 4 looking at the same from the top;

Fig. 5 is a section taken on the line 5—5 of Fig. 3;

Fig. 6 is a section taken on the line 6—6 of Fig. 4;

Figure 9:
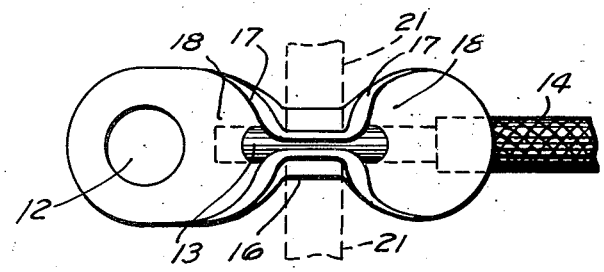
Fig. 9 is a view corresponding to Fig. 4 but showing the position of the punches.

Before commenting on the novel features and the important functions performed thereby, the improved coupling lug and the process of producing the same will be described.

In Fig. 1 the blank from which the complete coupling lug is made is a flat piece of metal preferably brass. This blank 10 is then punched out or bored to form two longitudinally spaced holes 11 and at one end a larger hole 12, all as shown in Fig. 2. The lead wire 13, which will usually be copper, and hence softer than the brass element 10, is shown as provided with the customary insulating cover 14 from which one end projects for connection to the coupling.

The intermediate portion of the lug blank 10 lying between the longitudinally spaced holes is now pressed upwardly to form a downwardly opening channel or trough 15 that opens at its ends through the now distorted holes 11 above the tops of the relatively flat end portions of the lug. The bare end of the wire is then inserted through the holes 11 and through the channel, as shown in Figs. 3 and 5.

As the next step, the sides of the channeled portion 15 are rolled on to the wire to form a split tubular portion which, in Figs. 4, 4a and 6, is indicated at 16, by means of a punch press or upsetting device. The tubular portion 16 is further compressed and forced more or less into the soft wire which will be somewhat indented especially at the slit edges of the tube. A tube thus compressed but left with a slight gap, under ordinary construction, would spring apart after it has been thus pressed on to the wire. However, as an important step in the formation of the wire receiving tube there are formed inwardly bent trussing flanges 17 which are put under such tension that they tend to press inward on the edges of the tube.

Figure 8:
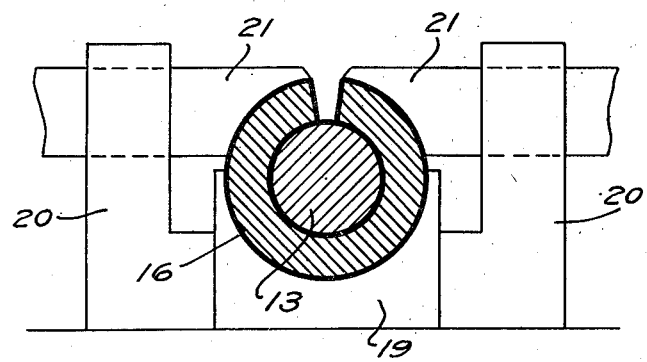
Fig. 8 is a view corresponding to Fig. 7 but showing the coupling lug completely pressed on to the lead wire.
Figure 7:
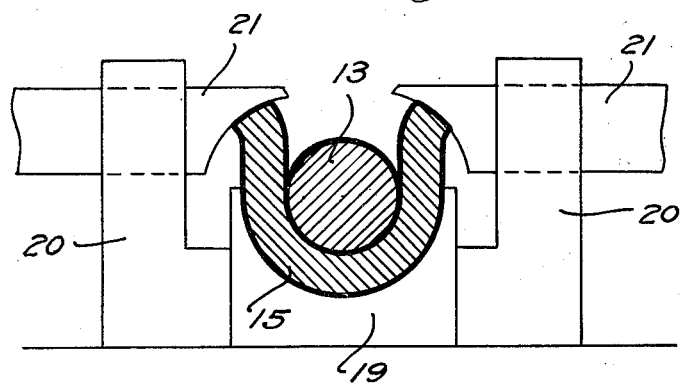
Fig. 7 is a view partly in section and partly in elevation, showing the punching or swaging device and illustrating one step in the process of producing the coupling lug.

Referring now to Figs. 7 and 8, the numeral 19 indicates a saddle block provided with laterally heavy guide flanges 20 through which work upsetting or swaging plungers 21. The saddle 19 is adapted to receive the tube-forming portion of coupling when it is in the condition shown in Figs. 3 and 5 with the wire 13 placed therein. By suitable power means not shown, the plungers 21 will be forced inward, thereby tightly pressing the tube-forming portion of the coupling on to the wire, as shown in Fig. 8; the structure thus produced then being that shown in Figs. 4, 5 and 6. In Fig. 9 the plungers 21, indicated by dotted lines, are shown as located between the ends of the tube, thereby pressing the sides of the plate together and on to the wire.

By reference to the drawings, it will be noted that the bottom of the coupling lug, especially the flanged ends thereof, lie substantially in a horizontal plane or on a flat surface; while the tubular portion is bulged upwardly, leaving a slit in the tube at the bottom of the coupling and, hence, not exposed to the view when the coupling is applied in the ordinary manner. The central tubular portion of the coupling is made very narrow, but still is made very strong by virtue of its tubular formation.

It will be further noted that the tubular portion 16, especially the open ends 11 thereof, are above the tops of the end flanges.

In the drawings the wire 13 is shown as solid wire, but very frequently that so-called wire will be made up of a multiplicity of small copper wires twisted together in the form of a cable. A cable thus formed will be very compressible so that the tube 16, when contracted, will be quite well sunken into the cable.

In the above described coupling, all of the connections are mechanically made without the use of solder, brazing, welding or the like, and there is no part that will be injured or loosened by the heat produced by an electric current by a wire attached thereto or from external heat such, for example, as will be produced in many of the couplings used in electrical toasters.

The above facts together with the facts that the device may be cheaply formed and is strong and durable, make the device highly desirable for many uses.

What I claim is:

1. The method of producing an electric wire coupling lug from an elongated substantially flat metal blank which consists in first forming longitudinally spaced substantially round holes in the flat blank, and in next pressing upwardly the metal lying between the longitudinally spaced holes to form a downwardly opening channel the ends of which open through said holes above the relatively flat end portions of the lug beyond the said holes.

2. The method of producing an electric wire coupling lug from an elongated relatively flat metal blank and anchoring a wire thereto which consists in first forming longitudinally spaced substantially round holes in the flat blank, in next pressing upwardly the metal lying between the said longitudinally spaced holes to form a downwardly opening channel the ends of which open through said holes above the relatively flat end portions of the lug beyond the holes, in next inserting the end of a wire longitudinally through the open ended channel, and in subsequently rolling the side portions of the channel over the interposed wire and contracting the same about the wire to form a substantially closed split tube tightly embracing the wire.

3. The method of producing an electric wire coupling lug from an elongated relatively flat metal blank and anchoring a wire thereto which consists in first forming longitudinally spaced holes in the flat blank, in next pressing upwardly the metal lying between the said longitudinally spaced holes to form a downwardly opening channel the ends of which, channel, open through said holes above the relatively flat end portions of the lug beyond the holes, in next inserting the end of a wire longitudinally through the open ended channel, and in substantially rolling the side portions of the channel over the interposed wire and contracting the same about the wire to form a substantially closed split tube tightly embracing the wire.

4. The method of producing an electric wire coupling lug from an elongated substantially flat metal blank, which consists in first forming longitudinally spaced holes in the flat blank, and in subsequently pressing outwardly the laterally intermediate longitudinally extended portion of the metal between said holes and drawing together the opposite edge portions of the lug between said holes to form a relatively narrow channel the ends of which open longitudinally through said pre-formed holes and the tops of the sides of which, channel, are formed by the intermediate edges of the blank and are connected to the edges of the flat end portions of the lug by curved edge portions of the lug.

5. The method of producing an electric wire coupling lug from an elongated substantially flat metal blank, which consists in first forming longitudinally spaced holes in the flat blank and in subsequently pressing outwardly a longitudinally extended intermediate portion of the blank and drawing together the laterally spaced edges of the lug opposite said pressed out portion, to form a lug consisting of relatively flat end portions connected by a relatively narrow channel the ends of which are longitudinally open outward of common faces of the said opposite flat end portions and the edges of which, channel, are continuous with the edges of the flat end portions of the lug and are connected thereto by curved edge portions.

6. The method defined in claim 4 which further includes the steps of inserting the end of a wire longitudinally through the open ended channel, and in thereafter rolling the side portions of the channel over the interposed wire and contracting the same about the wire to form a substantially closed split tube tightly embracing the wire and the edges of which, split tube, are continuous with and connected to the edges of the flat end portions of the lug by curved edge portions.

7. The method defined in claim 5 which includes the further steps of inserting the end of a wire longitudinally through the open ended channel, and in thereafter rolling the side portions of the channel over the interposed wire and contracting the same about the wire to form a substantially closed split tube tightly embracing the wire and the edges of which, split tube, are continuous with and connected to the edges of the flat end portions of the lug by curved edge portions.

8. A wire coupling lug comprising a relatively flat and relatively wide anchoring end portion and an integrally formed wire receiving channel extending longitudinally therefrom and opening longitudinally through the lug material adjacent said relatively flat end portion and outwardly of a face thereof, said channel being relatively much narrower than the flat end portion of the lug and having the tops of its opposite sides formed by edges that are continuous with and connected to the edges of the wider flat end portion of the lug by longitudinally curved edge portions.

9. A wire coupling lug comprising spaced relatively flat and relatively wide end portions, and an integrally formed longitudinally extended relatively narrow wire receiving channel connecting said spaced end portions, the ends of said channel opening through the lug material outwardly of common faces of the flat end portions of the lug and the edges of the said channel being continuous with the edges of said flat end portions and being connected thereto by longitudinally curved edge portions.

10. A wire coupling lug comprising relatively flat and relatively wide end portions, and an integrally formed relatively narrow split tubular intermediate portion, said split tubular intermediate portion opening longitudinally through the lug material at its ends and the opposite edges of the split tubular portion being continuous with and connected to the edges of the flat end portions of the lug by longitudinally curved edge portions.

11. The method of producing an electric wire coupling lug from an elongated substantially flat metal blank, which consists in forming a hole in the flat blank, and in subsequently pressing outwardly a longitudinally extended portion of the metal adjacent said hole and drawing together the opposite laterally spaced edge portions of the lug opposite said pressed out portion to form a relatively narrow channel an end of which opens longitudinally through said pre-formed hole and the top of the sides of which, channel, are formed by edges of the blank and are connected to the edges of the flat end portion of the lug by curved edge portions of the lug.

WILLIAM M. ANDERSON.